(12) United States Patent
Jung (10) Patent No.: US 7,972,217 B2
(45) Date of Patent: Jul. 5, 2011

(54) UNIVERSAL JOINT HAVING SLIP BUSH

(75) Inventor: Young-sock Jung, Wonju (KR)

(73) Assignee: Mando Corporation, Pyeongtaek Gyeonggi-Do (KR)

( * ) Notice: Subject to any disclaimer, the term of this patent is extended or adjusted under 35 U.S.C. 154(b) by 574 days.

(21) Appl. No.: 12/080,937

(22) Filed: Apr. 7, 2008

(65) Prior Publication Data
US 2008/0254902 A1 Oct. 16, 2008

(30) Foreign Application Priority Data
Apr. 12, 2007 (KR) ........................ 10-2007-0036030

(51) Int. Cl.
*F16C 3/03* (2006.01)
(52) U.S. Cl. ........................................ 464/167
(58) Field of Classification Search ................. 464/167; 384/49, 51, 54, 57
See application file for complete search history.

(56) References Cited

U.S. PATENT DOCUMENTS

| 4,176,888 A * | 12/1979 | Teramachi ............... 464/167 X |
| 2005/0215330 A1 | 9/2005 | Foster-Hamilton et al. |
| 2007/0215777 A1 * | 9/2007 | Mills ......................... 384/49 X |

FOREIGN PATENT DOCUMENTS
DE 203 18 654 U1 4/2004

OTHER PUBLICATIONS

Wagner, E. R., "Universal Joints" in Universal Joint and Driveshaft Design Manual, AE-7, Society of Automotive Engineers, Inc., p. 35, TJ1079.S62 1979.*
Chinese Office Action, w/ English translation thereof, issued in Chinese Patent Application No. CN 200810092463X dated Nov. 13, 2009.

* cited by examiner

Primary Examiner — Greg Binda
(74) Attorney, Agent, or Firm — McDermott Will & Emery LLP

(57) ABSTRACT

Universal joint having slip bush including a tube, a slip bush inserted into the tube, and a shaft inserted into and slidably engaged with the tube via the slip bush. The universal joint further includes: one or more rows of guide holes formed by perforating a circumferential wall of the slip bush, the rows being arranged in the longitudinal direction of the slip bush; one or more guide balls fitted in the guide holes, respectively; and one or more C-type parts longitudinally formed on the circumferential wall of the slip bush. When axial pressure is applied to the universal joint in a state in which rotational torque is applied to the universal joint, the guide balls fitted in the guide holes come into contact with the inner circumferential surface of the tube, thereby reducing sliding frictional force while producing rolling frictional force so that the universal joint can be smoothly collapsed. In addition, the guide balls serve as supports when torsional fracture torque is applied to the slip bush, thereby improving the torsional fracture strength, which in turn improves a safety factor.

3 Claims, 7 Drawing Sheets

UNIVERSAL JOINT HAVING SLIP BUSH

CROSS-REFERENCE TO RELATED APPLICATION

This non-provisional application claims priority under 35 U.S.C §119(a) on Patent Application No. 10-2007-0036030 filed in Korea on Apr. 12, 2007, the entire contents of which are hereby incorporated by reference.

BACKGROUND OF THE INVENTION

1. Field of the Invention

The present invention relates to a universal joint. More particularly, the present invention relates to a universal joint constructed in such a manner that when axial pressure is applied to the universal joint in a state in which rotational torque is applied to the universal joint, one or more guide balls fitted in one or more rows of guide holes formed through a circumferential wall of a slip bush come into contact with the inner circumferential surface of the tube, whereby the guide balls reduce sliding frictional force while producing rolling frictional force so that the universal joint can be smoothly collapsed, and that when torsional fracture torque is applied to the slip bush, the guide balls also serve as supports, thereby improving the torsional fracture strength of the slip bush, which in turn improves a safety factor.

2. Description of the Prior Art

Figure 1:
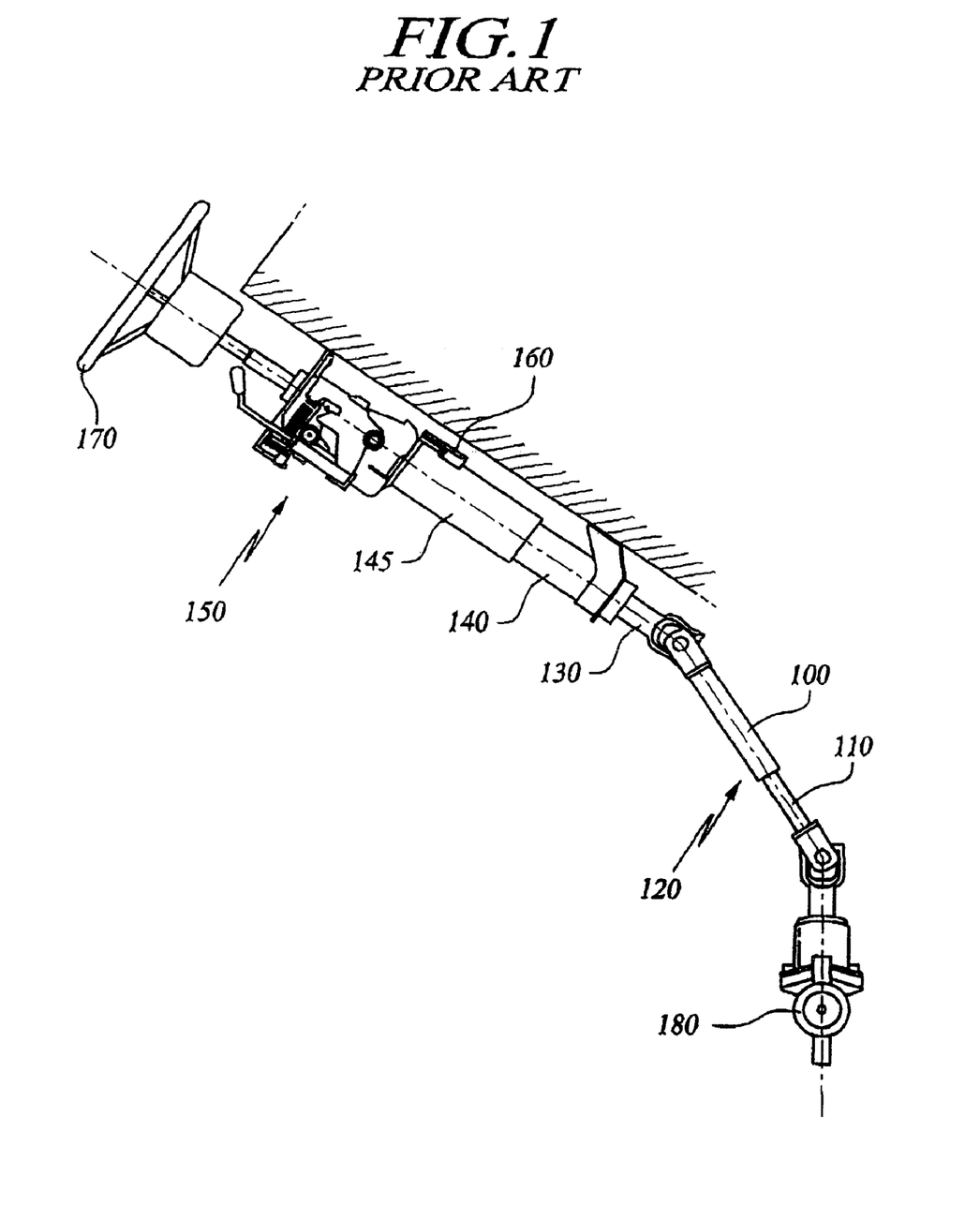
FIG. 1 is a view for exemplifying a steering apparatus employing a universal joint.

FIG. 1 exemplifies a steering apparatus employing a universal joint. In a steering apparatus for a vehicle, a lower end of a steering shaft 130 is connected to a gear box 180, wherein the steering shaft 130 should be connected to the gear box 180 at an inclined angle variable according to circumferential conditions. In order to meet this requirement, a universal joint 120 is employed.

Here, such a universal joint 120 typically includes a tube 100, a shaft 110 and a slip bush 200.

Such a universal joint 120 is connected to the steering shaft 130, which is connected with a steering wheel 170, at one end and is connected to the gear box 180 at the other end, thereby transmitting rotary power produced at the steering wheel 170 to wheels of the vehicle through the gear box 180.

A steering column 150 includes an outer tube 145, an inner tube 140 and a mounting bracket 160, wherein the outer tube 145 is formed at the steering wheel 170 side and the inner tube 140 has a diameter smaller than the inner diameter of the outer tube 145, so that the inner tube 140 can be inserted into the outer tube 145 when an impact is applied. Because each of the outer tube 145 and the inner tube 140 is formed from a hollow tube, the steering shaft 130 can be smoothly rotated.

Figure 2A:
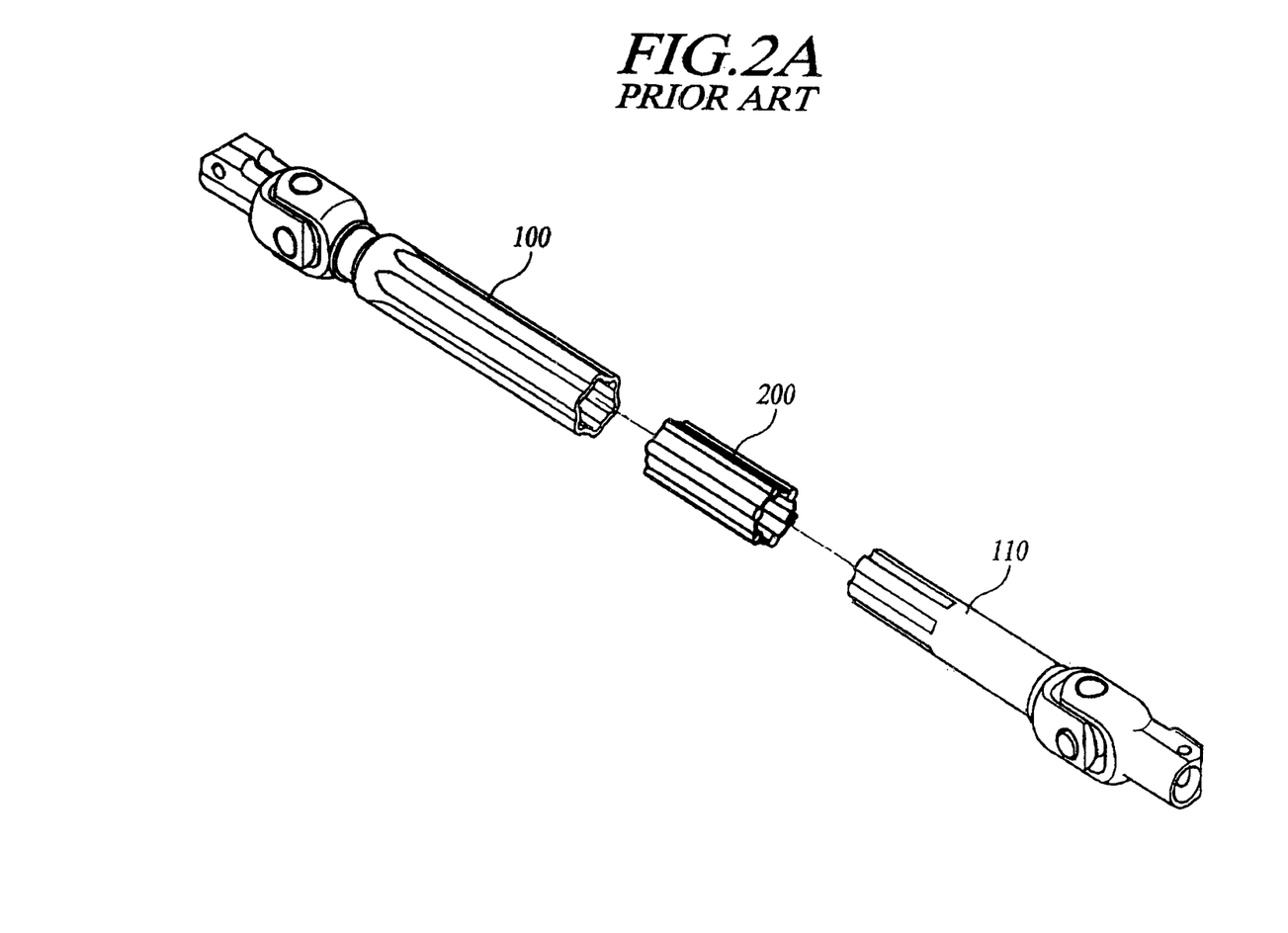
FIG. 2A is an exploded perspective view of a conventional universal joint.

FIG. 2A is an exploded perspective view of a conventional universal joint. As shown in FIG. 2A, the universal joint, which is connected to the steering shaft 130 so as to transmit the rotary movement of the steering wheel 170 to the gear box 180, includes a tube 100 and a shaft 110, wherein the shaft 110 is introduced into the tube 100 with a slip bush 200 interposed between them.

The tube 100 engaged with the outer circumferential surface of the slip bush 200 has an inner circumferential surface processed in a proper shape for smoothly guiding C-type parts 210 and solid parts 220, which are formed around the circumferential surface of the slip bush 200. The shaft 110 engaged with the inner circumferential surface of the slip bush 200 has an outer circumferential surface, a longitudinal end portion of which is processed to have a shape which is complementary to the shapes of the solid parts 220 and the C-type parts 210 on the inner circumferential surface of the slip bush 200, so that the longitudinal end portion can be introduced into the slip bush 200.

The engagement structure of the tube 100 and the shaft 110 with the slip bush 200 interposed between them is adapted to be extended or retracted in the axial direction thereof so as to make it possible to absorb an impact transmitted from wheels of the vehicle, as well as to improve the assemblability thereof. The engagement structure is adapted to absorb kick-back loads occurring due to impacts applied to the wheels of the vehicle by the unevenness of a road on which the vehicle travels. In addition, the engagement structure is also adapted to facilitate the assembly of the steering column 150 and the gear box 180 by being axially slid when the steering column 150 and the gear box 180 are assembled.

Figure 2B:
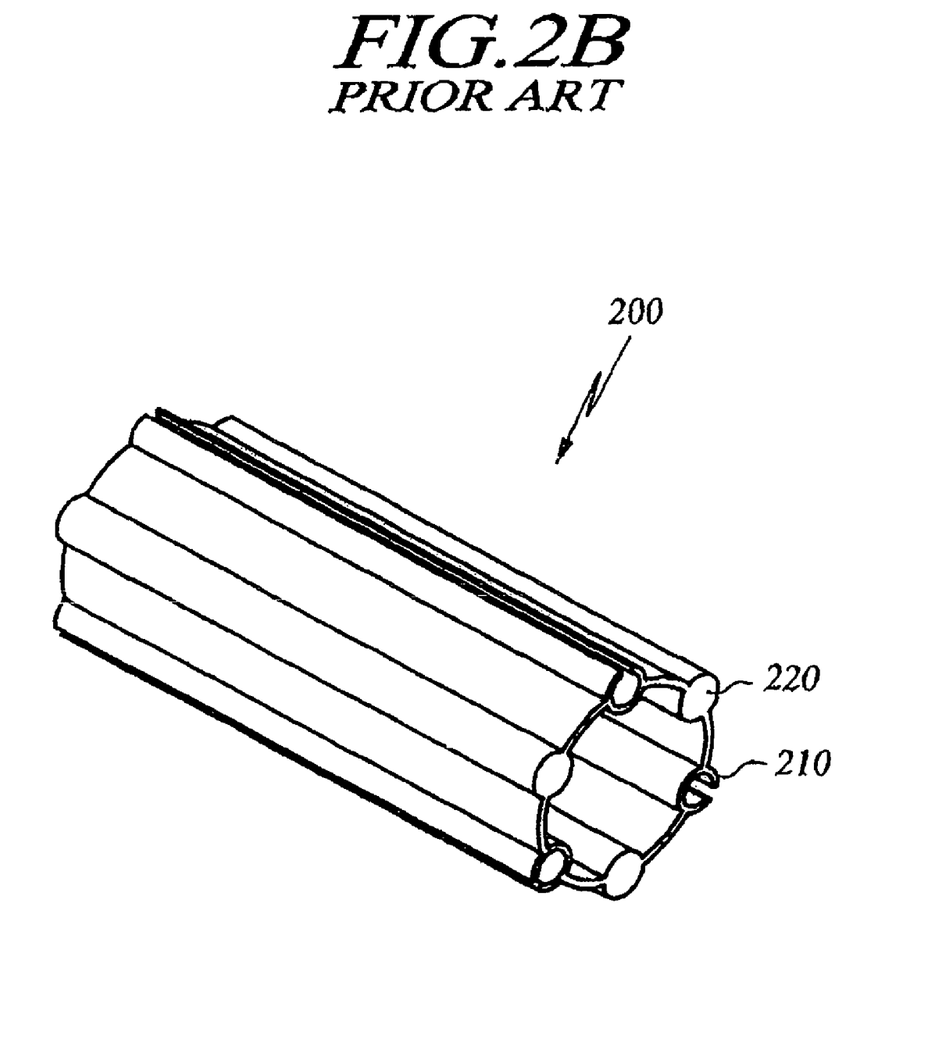
FIG. 2B is a perspective view of a slip bush in the conventional universal joint.

FIG. 2B is a perspective view of the conventional slip bush. As shown in FIG. 2B, the slip bush 200 made from a plastic material has three C-type parts 210 and three solid parts 220. The slip bush 200 is cylindrical, and the C-type parts 210 and the solid parts 220 are alternately formed around the circumferential surface of the slip bush 200 at regular intervals.

Each of the solid parts 220 is formed in a solid cylinder extending in the longitudinal direction of the slip bush 200, wherein a half of each solid part is formed on the outer circumferential surface of the slip bush 200 and the remaining half is formed on the inner circumferential surface, so that the halves are symmetric to each other. Each of the C-type parts 210 is formed in a hollow cylinder extending in the longitudinal direction of the slip bush 200, wherein each C-type part 210 also has two halves symmetrically formed on the inner and outer circumferential surfaces of the slip bush 200, respectively, and the half formed on the outer circumferential surface is slit in the longitudinal direction thereof.

Figure 2C:
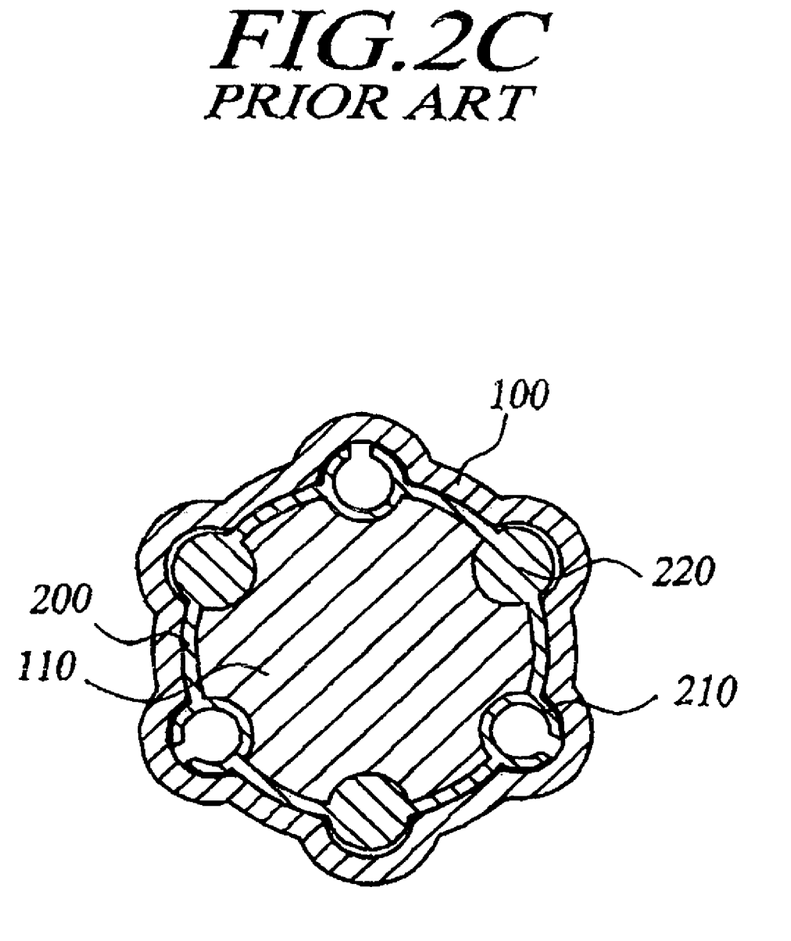
FIG. 2C is a cross-sectional view of the conventional universal joint.

FIG. 2C is a cross-sectional view of the conventional universal joint. As shown in FIG. 2C, the slip bush 200 interposed between the shaft 110 and the tube 100 is formed from a plastic material in a cylindrical shape and has three C-type parts 210 and three solid parts 220 alternately formed around the circumferential surface of the slip bush 200 at regular intervals.

The slip bush 200 has a configuration that makes the solid parts 220 come into close contact with the inner circumferential surface of the tube 100 when the shaft 110 is slid into the tube 100 in a state in which torsional torque and/or rotational torque are applied to the shaft 100, so that sliding frictional force is increased between the solid parts 220 and the tube 100. With this construction, sufficient torsional fracture strength can be secured for the slip bush 200.

The conventional solid parts 220 are integrally formed with the slip bush 200. When the shaft 110 is slid in a state in which rotational torque is applied to the shaft 110, the solid parts 220 are maintained in a state in which the entire outer circumferential surfaces of the solid parts 220 are in contact with the inner circumferential surface of the tube 100. As a result, there is a problem in that the sliding frictional force between the slip bush 200 and tube 100 increases and a safety factor in relation to the torsional fracture strength decreases.

That is, it is necessary that when an external impact, such as a vehicle collision, occurs, the universal joint should collapse with the aid of the sliding movement between the tube 100 and the shaft 110, thereby absorbing the impact, and at the same time, reducing the length of the steering column 150 so as to protect a driver. However, when the above-mentioned conventional slip bush 200 is employed, there is a problem in that when an impact with torsion is applied to the universal joint, it is impossible to secure driver's safety because the universal joint does not properly collapse due to large frictional force between the solid parts 220 of the slip bush 200 and the inner circumferential surface of the tube 100.

In addition, with the conventional slip bush, the load in the process of transmitting rotational force between the shaft and the tube is mainly applied to the solid parts of the slip bush. If so, due to the property of the material of the slip bush which is equal to that of the solid parts, the solid parts may be fractured when strong rotational force is applied within a short period of time, and when such a phenomenon occurs, it is impossible to perform steering, thereby causing a serious problem in safety. This problem is caused when the above-mentioned safety factor in relation to the torsional fracture strength decreases.

SUMMARY OF THE INVENTION

Accordingly, the present invention has been made to solve the above-mentioned problems occurring in the prior art, and the present invention is to provide a universal joint constructed in such a manner that when axial pressure is applied to the universal joint in a state in which rotational torque is applied to the universal joint, one or more guide balls fitted in one or more rows of guide holes formed through a circumferential wall of a slip bush come into contact with the inner circumferential surface of the tube, whereby the guide balls reduce sliding frictional force while producing rolling frictional force so that the universal joint can be smoothly collapsed, and that when torsional fracture torque is applied to the slip bush, the guide balls also serve as supports, thereby improving the torsional fracture strength of the slip bush, which in turn improves a safety factor.

In order to accomplish this object, there is provided a universal joint including a tube, a slip bush inserted into the tube, and a shaft inserted into and slidably engaged with the tube via the slip bush, the universal joint further including: one or more rows of guide holes formed by perforating a circumferential wall of the slip bush, the rows being arranged in the longitudinal direction of the slip bush; one or more guide balls fitted in the guide holes, respectively; and one or more C-type parts longitudinally formed on the circumferential wall of the slip bush.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3A:
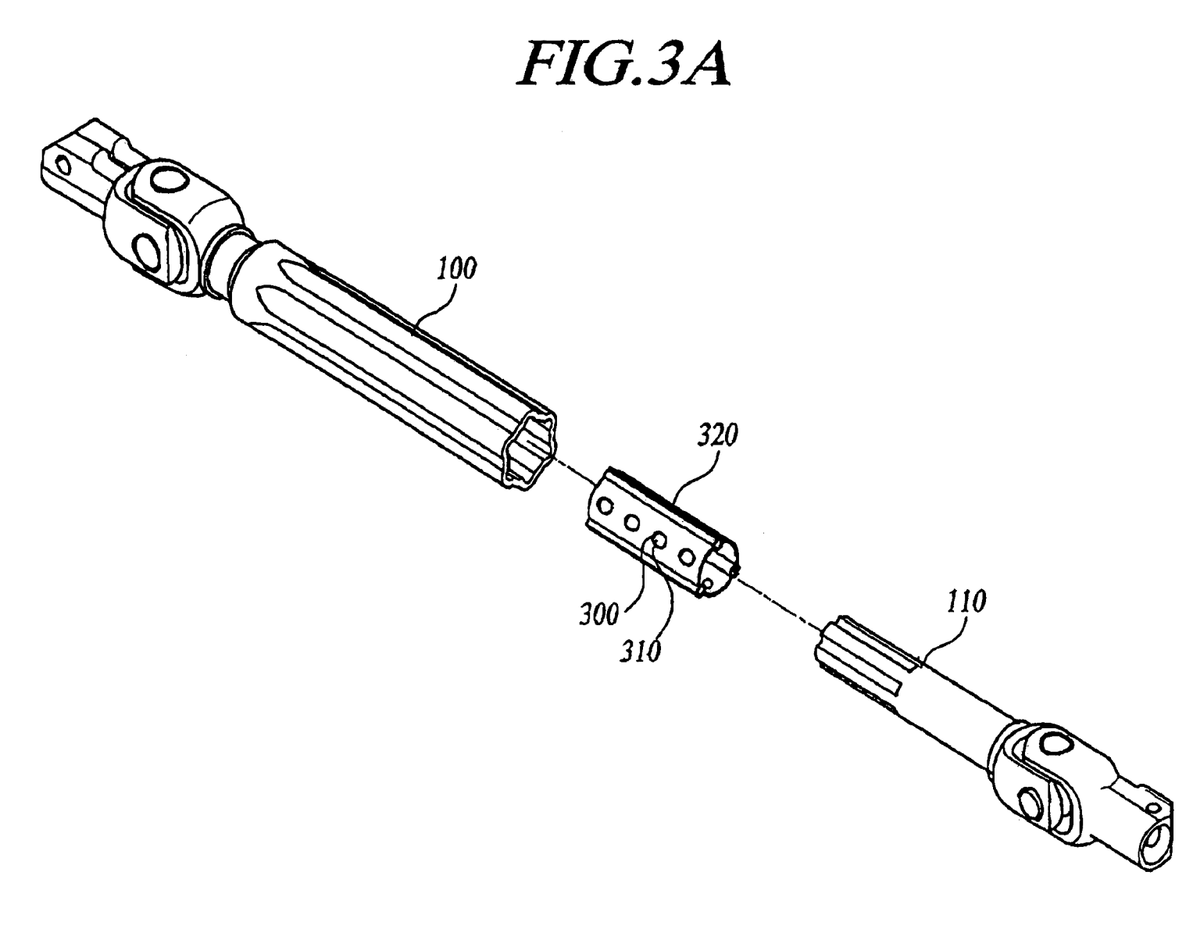
FIG. 3A is an exploded perspective view of a universal joint according to an embodiment of the present invention.

FIG. 3A is an exploded perspective view of a universal joint according to an embodiment of the present invention. As shown in FIG. 3A, the universal joint includes a slip bush 320 according to the present invention, wherein one or more rows of guide holes 300 formed by perforating the circumferential wall of the slip bush 320 are arranged in the longitudinal direction of the slip bush 320; one or more guide balls 310 are fitted in the guide holes 300, respectively; and one or more C-type parts 210 are longitudinally formed on the circumferential wall of the slip bush 320.

A shaft 110 of the universal joint 120 connected to a steering shaft 130 (see FIG. 1) is provided with a spline by forming six (6) ridges at a longitudinal end portion of the shaft, wherein three peaks are engaged with the C-type parts 210 of the slip bush 320 and the remaining three peaks come into contact with the guide balls 310 fitted in the guide holes 300, which are formed through the circumferential wall of the slip bush 320.

The inner circumferential surface of the tube 100 is processed to have a shape, which is complementary with that of the outer circumferential surface of the slip bush 320 so that the shaft 110 with the spline and the slip bush 320 mounted on the shaft 110 can be inserted into the tube 100.

The slip bush 320 is formed in a hollow cylindrical shape, the length of which is determined to correspond to that of the spline of the shaft 110. One or more rows of guide holes 300 are longitudinally perforated, the rows of the guide holes 300 being distributed in the circumferential direction of the slip bush 320. Also, one or more C-type parts 210 are formed on the slip bush 320.

Preferably, the rows of the guide holes 300 and the C-type parts 210 are alternately arranged along the circumference of the slip bush 320.

The guide balls 310 fitted in the guide holes 300 should provide rolling frictional force between the outer circumferential surface of the spline formed on the shaft 110 and the inner circumferential surface of the tube 100 formed in a corresponding spline shape when the shaft 110 is introduced into the tube 100 in the state in which rotational torque is applied. Therefore, it would be desired that the diameter of each of the guide holes 300 is somewhat larger than that of each of the guide balls 310, so that the guide balls 310 can be freely rotated in the state in which they are fitted in the guide holes 300, respectively.

In the embodiment shown in the drawings, there are four guide holes 300 in a row and guide balls 310 are fitted in the guide holes 300, respectively, however the present invention is not limited to this.

That is, the number of guide holes 300 formed in each row may be three or less or five or more depending on the desired magnitude of rolling frictional force, and the number of the guide balls 310 fitted in the guide holes 300 is determined depending on the number of the guide holes 300.

In addition, in the embodiment shown in the drawings, three rows of guide holes 300 and three C-type parts 210 are alternately arranged in the circumferential direction of the slip bush 320, however the present invention is not limited to this. Depending on the desired magnitude of rolling frictional force and the number of the ridges of the spline formed on the shaft 110, two or less rows of guide holes or four or more rows of guide holes may be formed.

Although each of the guide balls 310 is formed in a spherical shape, preferably from high carbon steel, which is superior in wear resistance, so as to provide rolling frictional force and to secure high torsional strength when the shaft 110 is introduced into the tube 100 in a state in which rotational torque is applied, the present invention is not limited to this. If it is possible to provide proper rolling frictional force and sufficient strength, the guide balls may be formed from another material.

Each of the C-type parts 210 is formed in a hollow cylindrical shape, and the portions of the C-type parts 210 positioned on the outer circumferential surface of the slip bush 320 are longitudinally slit at predetermined areas thereof.

Figure 3B:
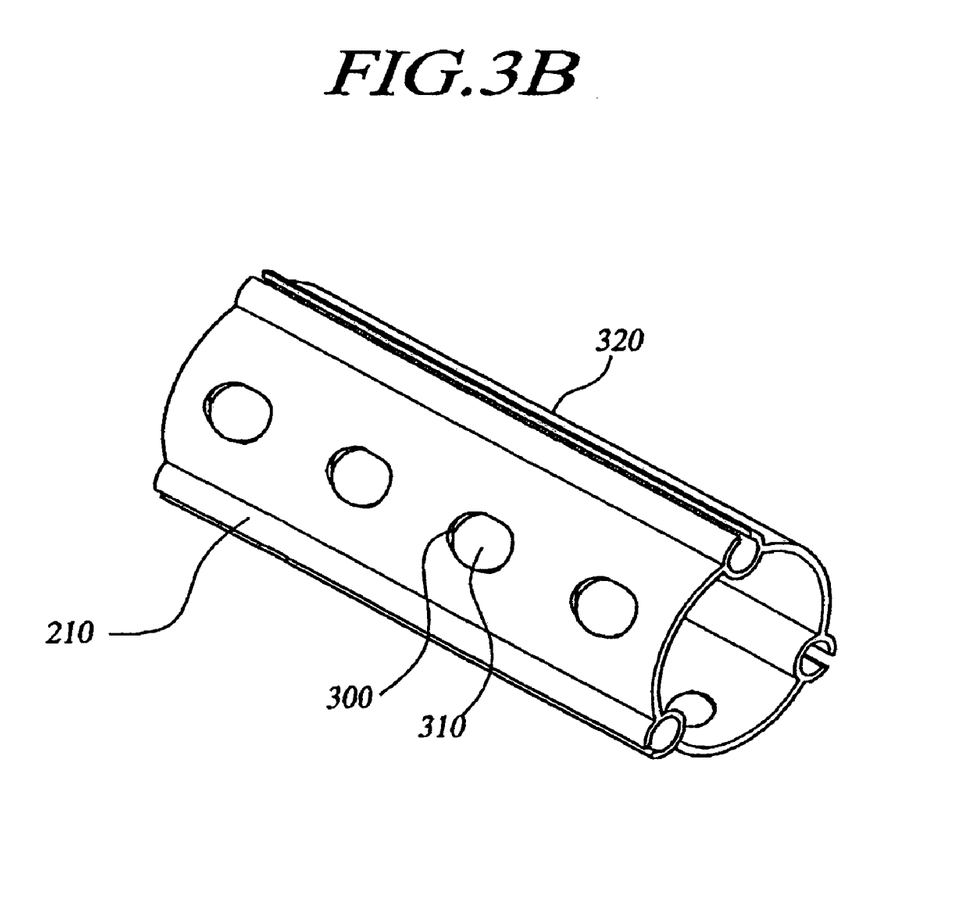
FIG. 3B is a perspective view of a slip bush in the universal joint according to the embodiment of the present invention.
Figure 3C:
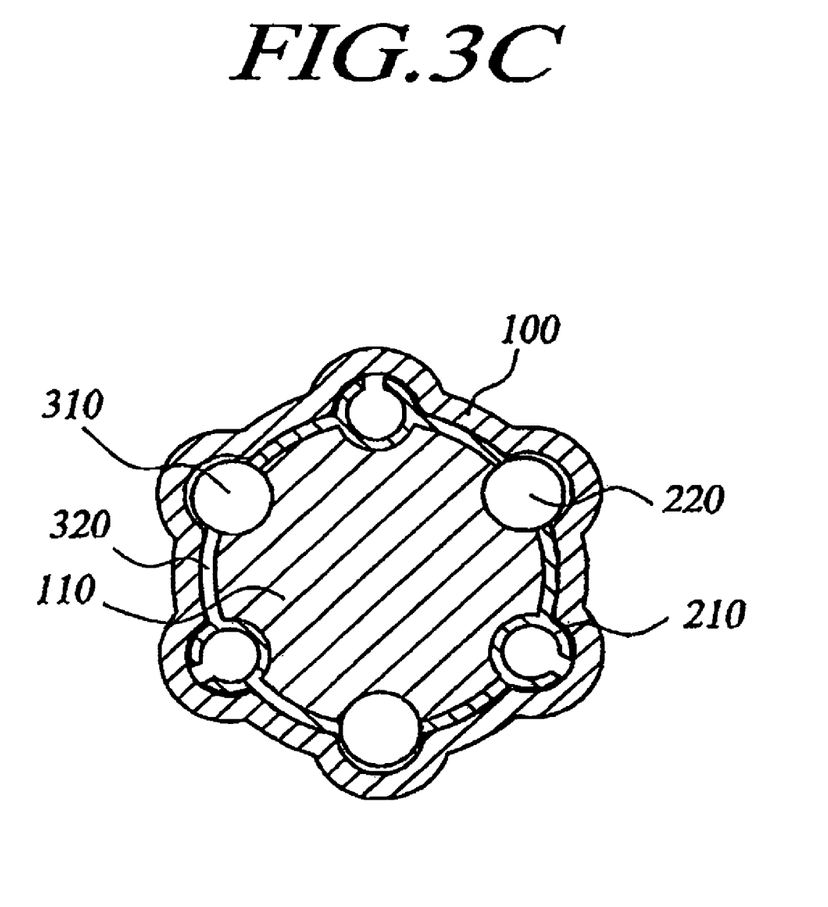
FIG. 3C is a cross-sectional view of the universal joint according to the embodiment of the present invention.

FIG. 3B is a perspective view of the slip bush in the universal joint according to the embodiment of the present invention and FIG. 3C is a cross-sectional view of the universal joint according to the embodiment of the present invention.

As shown in FIGS. 3B and 3C, the slip bush 320 is interposed between the tube 100 and the shaft 110. The slip bush 320 is formed from a plastic material, and properly provides frictional force between the tube 100 and the shaft 110 when the shaft 110 is introduced into or extracted from the tube 100. In addition, the slip bush 320 serves to transmit rotary force received from the tube 100 through the steering wheel 170 (see FIG. 1) to the shaft, and to absorb kick-back load reversely inputted through the wheels of the vehicle when the vehicle runs, thereby improving a steering feeling.

The guide balls 310 fitted in the guide holes 300 are slightly spaced from the inner circumferential surface of the tube 100 at no-load, so that they do not produce rolling frictional force. However, if the shaft 110 is introduced into or extracted from the tube 100 in a state in which rotational torque is applied, the guide balls come into contact with the inner circumferential surface of the tube 100, thereby producing rolling frictional force.

With the conventional slip bush 200, the solid parts 220 are integrally formed with the slip bush 200, and the entire outer circumferential surfaces of the solid parts 220 comes into contact the inner circumferential surface of the tube 100. Consequently, high sliding frictional force is generated between the tube 100 and the slip bush 200, and the solid parts 220 are easily worn. Therefore, the conventional slip bush 200 has a problem in providing proper frictional force. However, with the inventive slip bush 320, the conventional solid parts 220 are removed and one or more rows of guide holes 300 are formed in the positions of the conventional solid parts 220 and guide balls 310 are fitted in the guide holes 300, respectively. As a result, it is possible to prevent the occurrence of excessive sliding frictional force, even if the contact areas between the slip bush 320 and the inner circumferential surface of the tube 100 are converted into points, and the transmission of rotational torque between the shaft 110 and the tube 100 can be easily effected.

In addition, when torsional fracture torque is applied, the guide balls 310 serve as supports, thereby improving torsional fracture strength, and hence increasing a safety factor.

Because the portions of the C-type parts 210 formed on the outer circumferential surface of the slip bush 320 are longitudinally slit, the slit areas provide play spaces which serve to prevent the occurrence of a clearance between the inner circumferential surface of the tube 100 and the outer circumferential surface of the slip bush 320 coming into contact with the inner circumferential surface of the tube 100.

That is, the slit areas of the C-type parts 210 are pressed while the slip bush 320 is being introduced into the tube 100, and the slit areas are returned to their original position after the slip bush 320 is introduced into the tube 100. As a result, the slit areas come into close contact with the inner circumferential surface of the tube 100, so that frictional force is properly produced between the inner circumferential surface of the tube 100 and the outer circumferential surfaces of the C-type parts 210, thereby preventing the occurrence of clearance between the slip bush 320 and the tube 100.

As described above, according to the present invention, when axial pressure is applied to the universal joint in a state in which rotational torque is applied to the universal joint, the guide balls fitted in the guide holes formed through the circumferential wall of the slip bush come into contact with the inner circumferential surface of the tube, thereby reducing sliding frictional force while producing rolling frictional force so that the universal joint can be smoothly collapsed. In addition, the guide balls serve as supports when torsional fracture torque is applied to the slip bush, thereby improving the torsional fracture strength of the slip bush, which in turn improves a safety factor.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A joint having slip bush comprising a tube, a slip bush inserted into the tube, and a shaft inserted into and slidably engaged with the tube via the slip bush, the universal joint further comprising:
    one or more rows of guide holes formed by perforating a circumferential wall of the slip bush, the rows being arranged in the longitudinal direction of the slip bush;
    one or more guide balls fitted in the guide holes, respectively; and
    one or more C-type parts longitudinally formed on the circumferential wall of the slip bush, said one or more C-type parts including a portion arranged radially outward of an outer surface of said circumferential wall.

2. The joint having slip bush as claimed in claim 1, wherein the rows of the guide holes and the C-type parts are alternately arranged along the outer circumferential wall of the slip bush.

3. The joint having slip bush as claimed in claim 1, wherein said one or more C-type parts comprises a hollow cylindrically shaped part including a longitudinal slit defining a slit area between free ends of said hollow cylindrically shaped part,
    wherein said portion includes said slit area.

* * * * *